June 12, 1962 W. P. DINGLEDY 3,038,503
TUBULAR STRUCTURE
Filed June 1, 1959
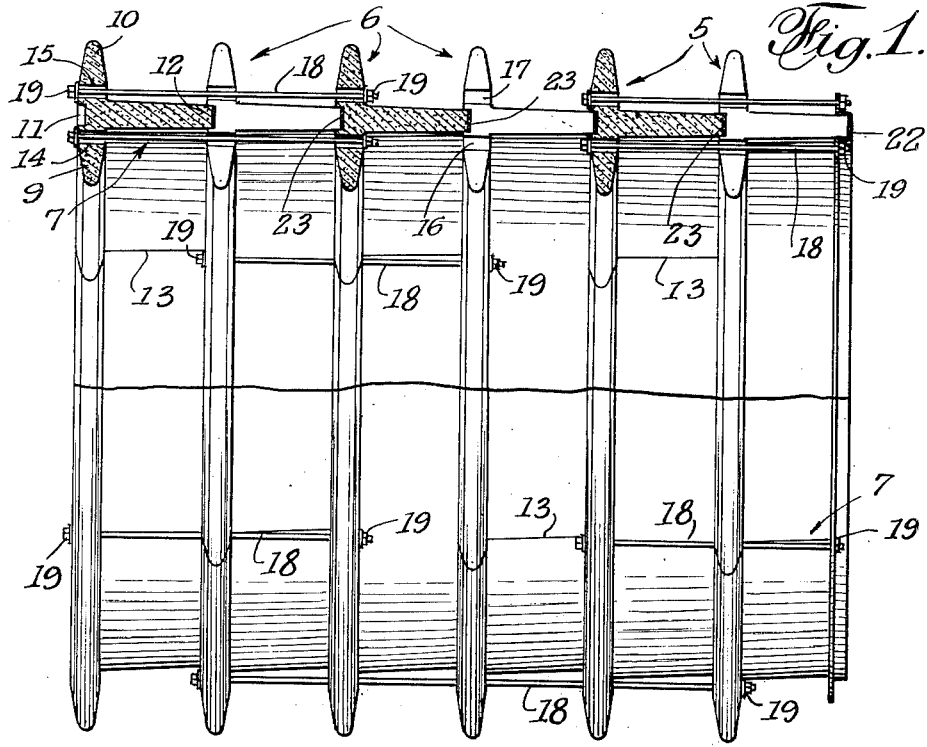
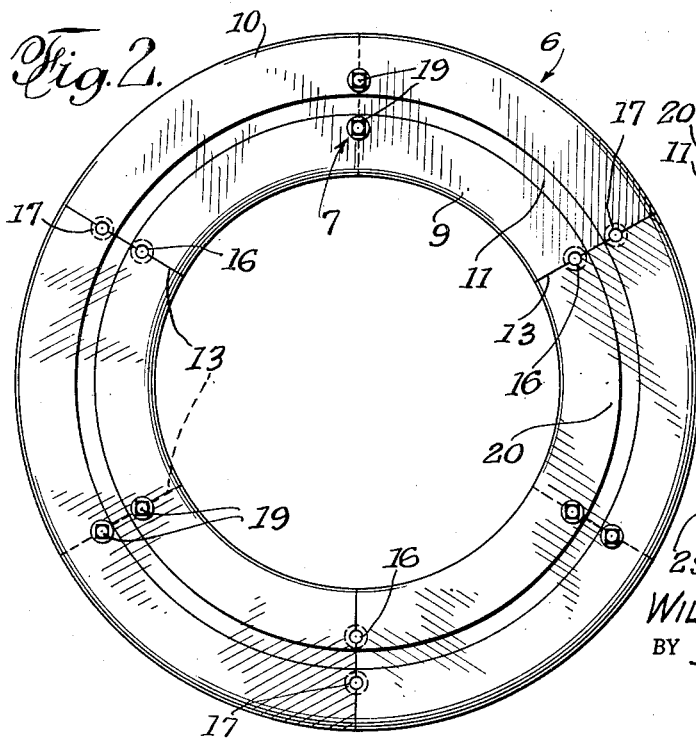
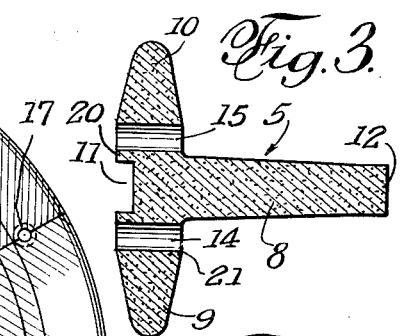
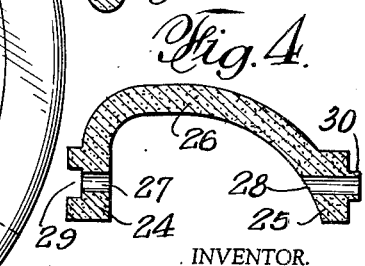
INVENTOR.
WILLIAM P. DINGLEDY
BY C. G. Stratton
ATTORNEY

United States Patent Office 3,038,503
Patented June 12, 1962

3,038,503
TUBULAR STRUCTURE
William P. Dingledy, 3303 Cardiff Ave.,
Los Angeles, Calif.
Filed June 1, 1959, Ser. No. 817,102
3 Claims. (Cl. 138—155)

This invention relates to a tubular structure of the type adapted for use, horizontally, as culverts and shelters, and, vertically, as silos. Such uses, of course, are representative. More specifically, the invention pertains to sectional tubular structures that, when assembled, may be of great size, and yet are made up of elements that may be readily handled by one or two persons assembling the same. It is an object of this invention to provide such a tubular, sectional structure that has general use and is especially useful for resisting percussive forces, as may be imposed on bomb shelters, for instance, and other disrupting forces.

Another object of the invention is to provide a mortarless sectional structure of the character referred to, in which the sections are formed of segments that are circumferentially offset or staggered.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

FIG. 1 is a side elevational view, in quarter section, of a tubular structure according to the present invention.

FIG. 2 is an end elevational view thereof.

FIG. 3 is an enlarged sectional view of an element used in the structure.

FIG. 4 is a similar view of a modification.

The tubular structure that is illustrated is comprised, generally, of a plurality of segments 5 arranged as elements of a plurality of inter-nested rings 6, and tie means 7 that connect said rings to integrate the structure. The segments are preferably molded elements and are advantageously made of cement or concrete and may incorporate reinforcing rods or other members, as is common practice in cement and concrete. The tie means may comprise rods, bolts, or cables and, generally, advantageously are applied in tension so as to apply compression forces on an assembly of segmental rings.

Regardless of the cross-sectional form of the segments 5, the invention contemplates that for tubular structures as large as six to seven feet, internal diameter, said segments extend through circumferential arcs of 120°. In order that such 120° segments of cement or concrete be capable of being handled by not more than two persons, the same are preferably made to extend not more than between eight and twelve inches in a direction parallel to the axis on which the curvature of the segments is generated. Also, in the interests of handleability, the cross-sectional form of the segments is preferably reduced to thicknesses between one and two inches, the latter being exemplary.

As seen in FIGS. 1 to 3, a preferred sectional form has a T-cross-section, the portion 8 comprising a tubular collar and the respective portions 9 and 10 comprising inner and outer flanges that extend from one end of said collar to provide the T-shape mentioned. Said end of the collar is provided with a groove 11 of a size to receive the opposite end 12 of a contiguous segment. This arrangement may be seen in FIG. 1 wherein is shown six rings each made up of three segments of sectional form as in FIG. 3.

It will be noted that the segments of adjacent rings are staggered or offset circumferentially so that the seams 13 formed where the ends of the segments abut are staggered in adjacent rings. By such an arrangement, with the ends 12 of the segments in the grooves 11 of the segments of adjacent rings, the assembly of such segment-formed rings 6 will be maintained, provided the rings are held compressed one against the other. Such compression is afforded by the tie means 7.

In order to accommodate the tie means 7, each segment, in the form of FIGS. 1, 2 and 3, is formed to have holes 14 and 15 midway between the ends that form the seams 13 and, respectively, in the inner and outer flanges 9 and 10 on each side of the collar 8. At the ends mentioned there are similarly provided half holes 16 and 17. Said half holes match up at the seams, as can be seen from FIG. 2. In the larger segments, more than one set of holes 14 and 15 may be provided.

It will be clear that the matched half holes 16 and 17 of one ring will align with the holes 14 and 15 of an abutting ring and that a rod, bolt or cable 18 of the tie means may pass through such aligned holes and, by extending to a length to connect at least three rings 6, will effectively lock such rings together if the head or nut ends 19 of said rods, bolts or cables are engaged with the holes 14 and 15 and the latter pass through the matched half holes. FIG. 1 shows that rods 18 may extend to connect five rings and, of course, may extend to connect seven or more rings, if desired.

FIG. 1 shows how a bolt 18 may have its ends 19 engaged at one end with the outer side 20 of the flanges 9 and 10 and, at the other end, with the inner side 21 of the third ring therefrom. It will be clear that such a condition may prevail where the end ring 6 at the right of FIG. 1 is connected. In other cases, a flanged metal cap member 22 may be provided on the ends 12 of said end ring 6 and the same used to anchor the ends 19 of the bolts 18.

In order to obviate forces that may cause the segments to crack or craze, pressure rings or seals 23 may be placed in the grooves 11 and compressed therein by the segment ends 12 when the tie means are taken up. Such seals comprise gaskets that obviate leakage into the interior of the structure.

The cross-sectional form of the segments may vary. FIG. 4, for instance, shows a form in which the opposite ends 24 and 25 of the segments are connected by a transversely arched wall 26 and said ends are apertured at 27 and 28 to pass the tie means 7. The groove 29 receives therein the arcuate tenon 30 of an abutting ring in the same way that groove 11 receives the end 12, as above described.

It is to be noted that the modification uses only an inner rod to connect the rings. This may be the case with the earlier form which may use either inner or outer rods rather than both.

The larger diameter structures may be made of segments that have flanges 9 and 10 that are proportionally smaller than the flanges, as shown. In other words, the proportional sizes of the collar and flanges may be varied according to use and strength desired.

While the foregoing specification illustrates and describes what I now contemplate to be the best mode of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described the invention, what is claimed and desired to be secured by Letters Patent is:

1. In a tubular structure, at least three longitudinally arranged rings, each ring comprising at least three curved segments of the same circumferential extent, each said segment having end faces and said faces being in abutment with the end faces of adjacent segments in a ring, a hole through the middle of each segment and a half hole in each end face of each segment, the holes in each segment of one ring being in longitudinal register with the matched half holes in the segments of an adjacent ring, the segments of said adjacent rings being circumferentially offset accordingly, and a set of longitudinal tie bolts extending through the aligned holes and half holes of the segments of said three rings to tie said rings together.

2. In a tubular structure according to claim 1, each segment having a portion that is offset from the holes therein to expose the tie bolts between the holes of the segments of adjacent rings and to expose the ends of said bolts, and bolt heads on said exposed ends.

3. In a tubular structure, a plurality of longitudinally arranged adjacent ring segments, each ring segment comprising a plurality of abutting sections having one set of mating edges forming an annular groove and an opposite set of mating edges forming an annular tenon, said sections being further provided with a plurality of integral protruding portions forming annular surfaces, said annular surfaces of adjacent segments having aligned holes, and tie rods extending through said holes to maintain the groove and tenon of adjacent segments engaged and said segments in tight assembly, said annular surfaces being T-shaped with portions extending both inside and outside said ring segments, and the mentioned tie rods extending through both said inside and outside portions.

References Cited in the file of this patent

UNITED STATES PATENTS

| 77,285 | Holske | Apr. 28, 1868 |
| 385,292 | Baltzley | June 26, 1888 |
| 542,978 | Saunders | July 16, 1895 |
| 1,097,151 | Van Gilder | May 19, 1914 |
| 1,600,179 | Ingerslev | Sept. 14, 1926 |
| 1,898,380 | Meier | Feb. 21, 1933 |

FOREIGN PATENTS

| 383,315 | Germany | Oct. 12, 1923 |